US007606567B1

(12) United States Patent
Katz

(10) Patent No.: US 7,606,567 B1
(45) Date of Patent: Oct. 20, 2009

(54) CHANNEL ALLOCATION FOR BURST TRANSMISSION TO A DIVERSITY OF SATELLITES

(75) Inventor: Daniel A. Katz, 87 Tzahal st, Kiryat Ono (IL) 55451

(73) Assignee: Daniel A. Katz, Kiryat-Ono (IL)

( * ) Notice: Subject to any disclaimer, the term of this patent is extended or adjusted under 35 U.S.C. 154(b) by 0 days.

(21) Appl. No.: 12/113,623

(22) Filed: May 1, 2008

(51) Int. Cl.
*H04Q 7/20* (2006.01)
(52) U.S. Cl. .................. 455/429; 455/33.1; 455/452.2; 455/556.2; 375/141; 375/145; 370/310; 370/312; 342/352; 342/354
(58) Field of Classification Search ............... 455/33.1, 455/33.2, 33.4, 63, 73, 103, 429, 434, 452.1, 455/452.2, 509, 510, 450, 455, 560, 561, 455/556.2; 370/310, 312, 316, 319, 320, 370/321, 322, 337, 345, 346, 347, 348, 431, 370/432, 436, 437, 441, 442, 443, 444, 447, 370/458; 375/141, 145, 354.1, 356; 342/352, 342/354, 357.1
See application file for complete search history.

(56) References Cited

U.S. PATENT DOCUMENTS 5,268,694 A * 12/1993 Jan et al. ..................... 342/354
6,115,371 A * 9/2000 Berstis et al. ............... 370/345

* cited by examiner

*Primary Examiner*—Nay A Maung
*Assistant Examiner*—Tuan H Nguyen

(57) ABSTRACT

A method for allocating transmission channels to devices configured to communicate short data packets to a diversity of non geostationary satellites is disclosed hereby. The method suggests a dynamic cellular partitioning of the earth surface, based on the smallest intersections of overlapping satellite service areas ("footprints"), defined as mega-cells, and reusing channels in different mega-cells. In addition, a transmission cycle is defined and divided to time slots, synchronized at each device by GPS timing signals, and mega-cells served by more satellites are allocated with fewer time slots, in order to increase the chance of transmitters placed in mega-cells served by fewer satellites to be detected. Further, each mega-cell is divided to cells, and different channels and time slots are allocated to each cell, from those allocated to the corresponding mega-cell. Consequently, collision of transmissions from different mega-cells is reduced, and collision of transmissions from different cells in a mega-cell is avoided.

20 Claims, 6 Drawing Sheets

Overview of a System for Burst Transmission to a Diversity of Satellites

Figure 1 - Overview of a System for Burst Transmission to a Diversity of Satellites
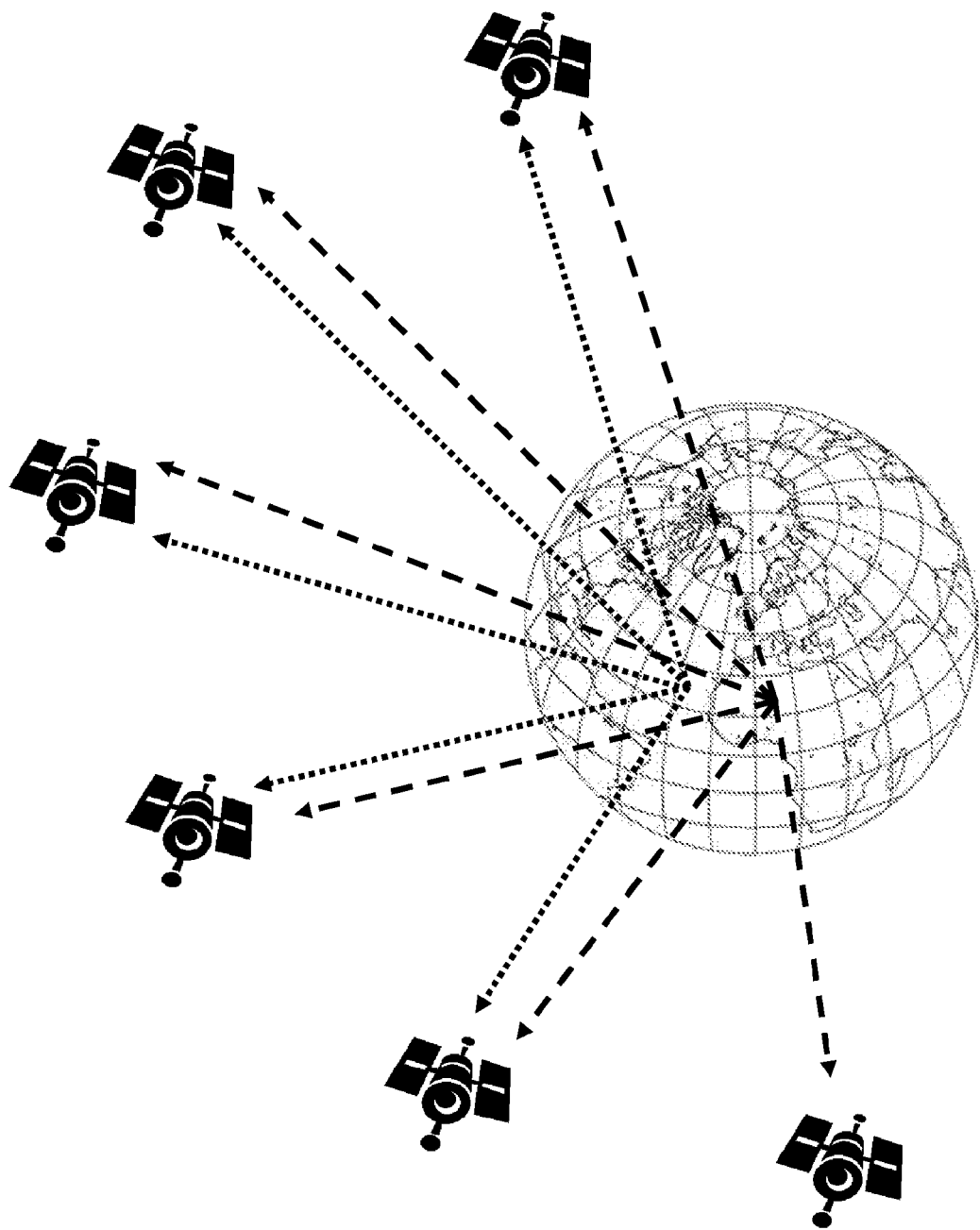

Figure 2 – Block Diagram of a Device for Burst Transmission to a Diversity of (SAR) Satellites
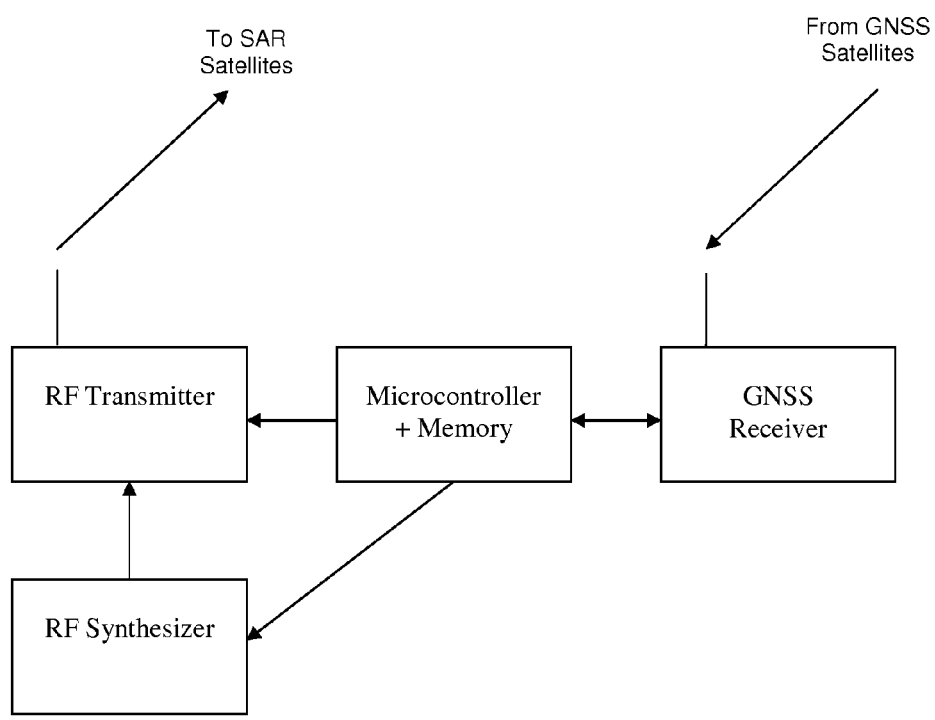

Figure 3a – Footprint of Satellite on Earth Surface (Isometric view)
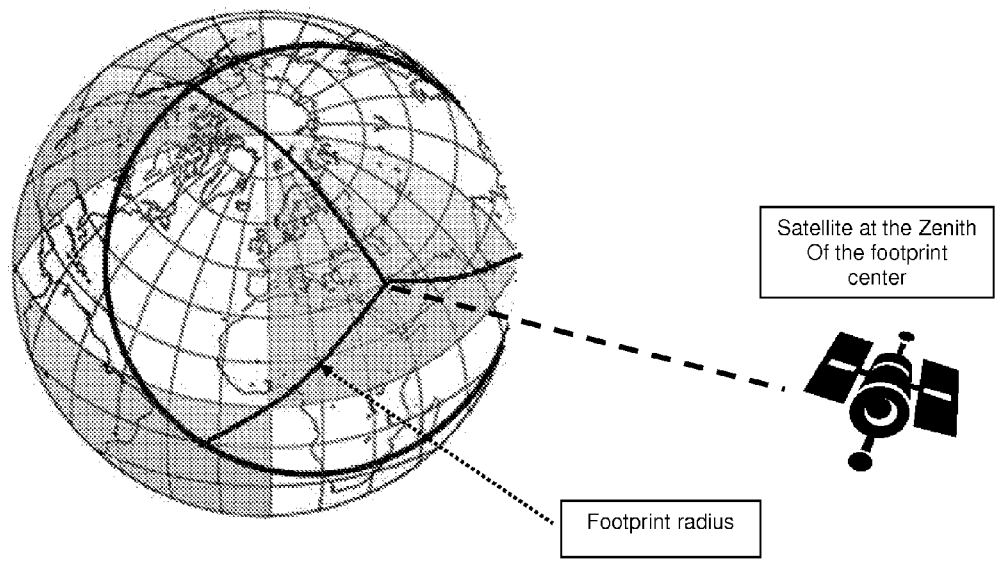
Figure 3b – Footprint of Satellite on Earth Surface (Sectional view)
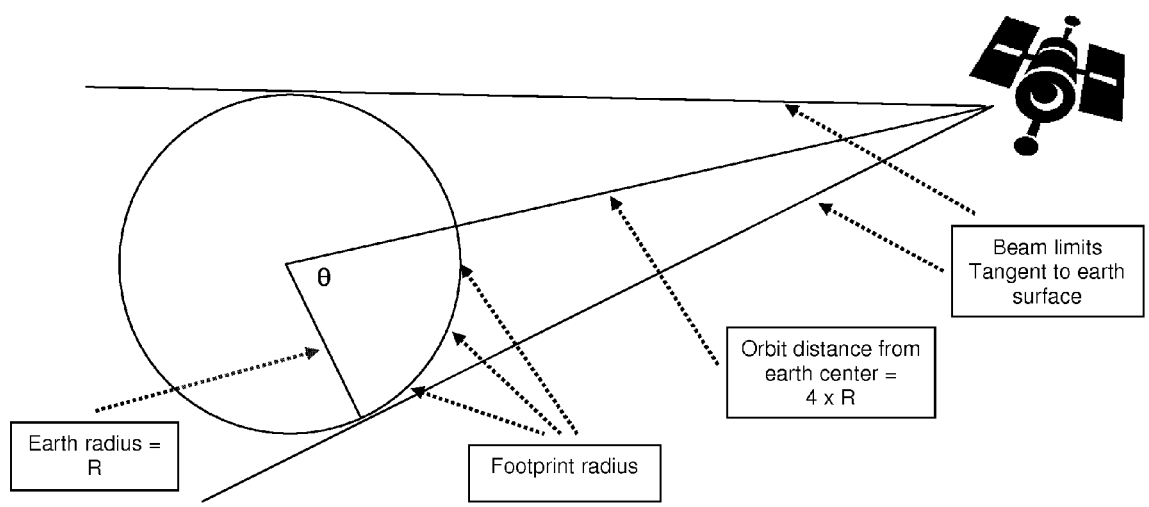

Figure 4 – illustration of overlapping footprints of 24 satellites on the earth surface
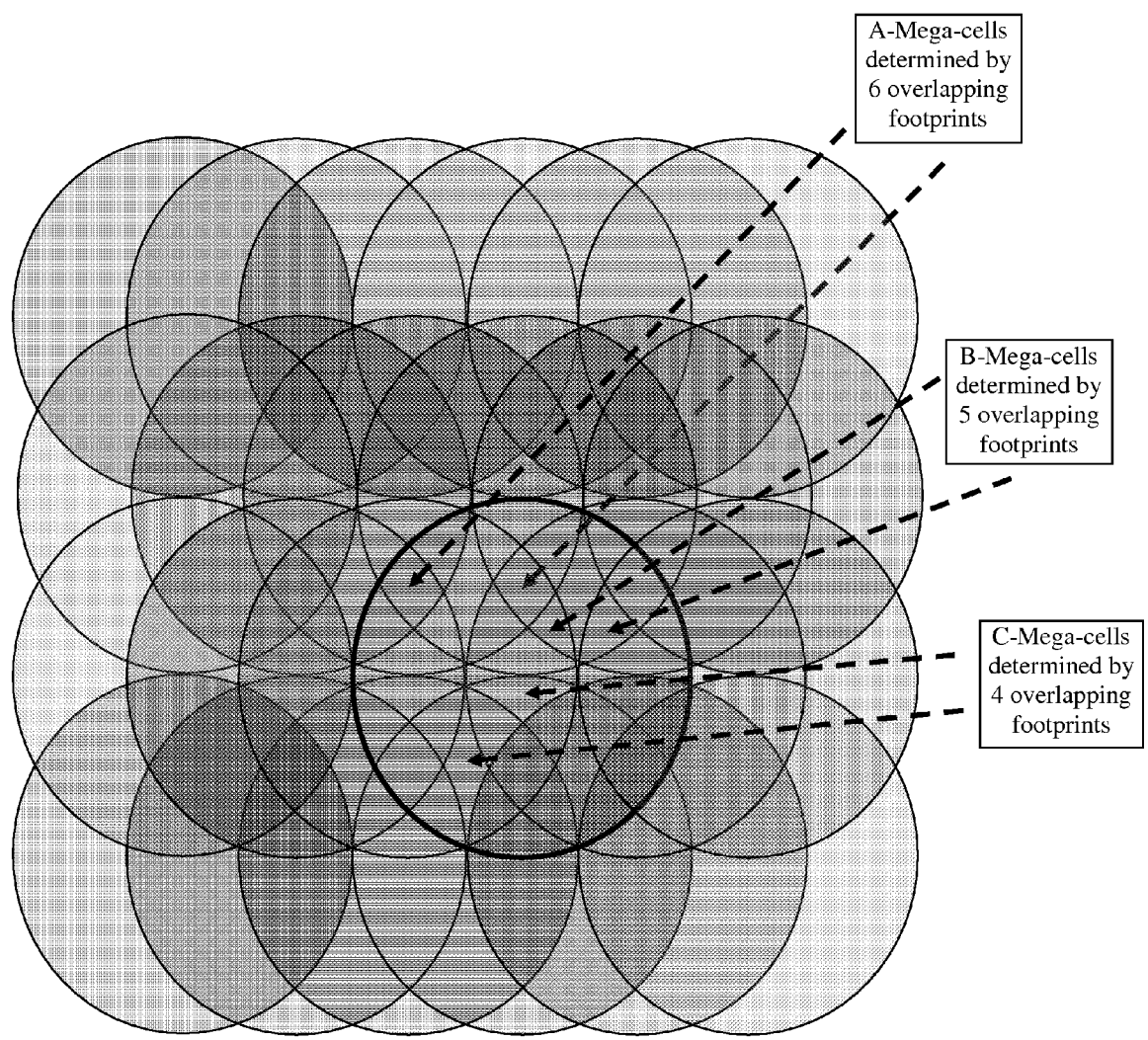

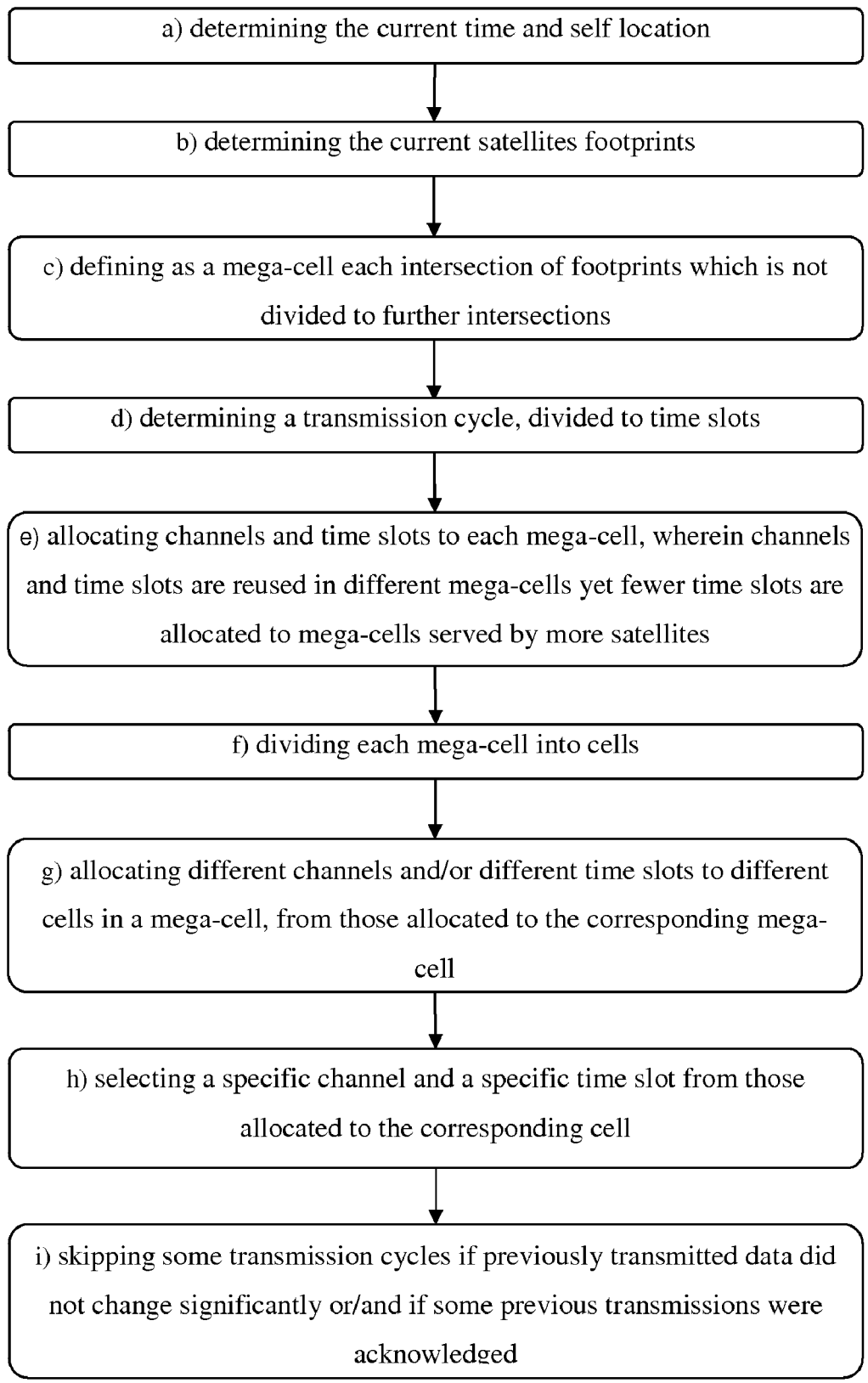
Figure 5 – Channel Allocation Flow Chart

Figure 6 - Allocation of channels and time slots to mega-cells and cells
Allocation to 100 cells in A-mega-cells
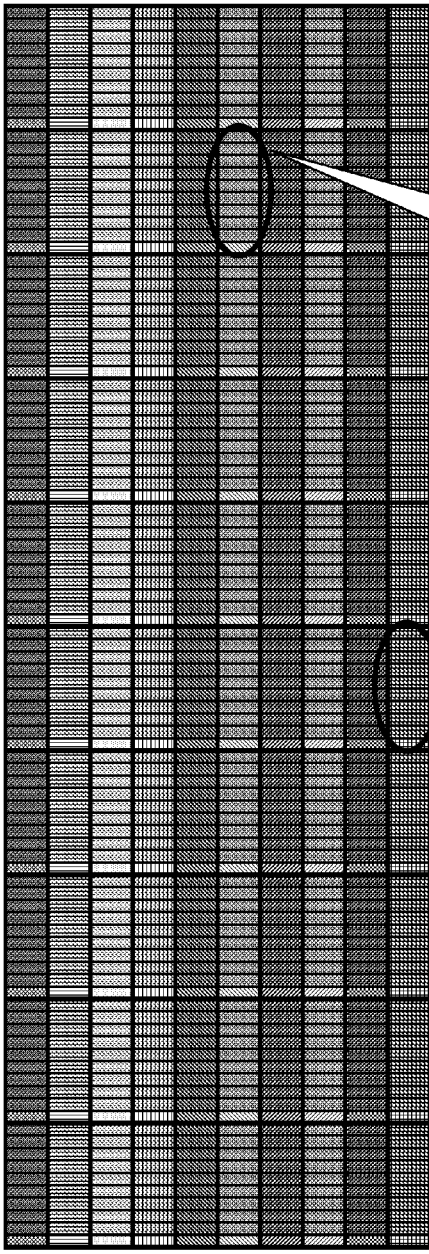
Allocation to 100 cells in B/C-mega-cells
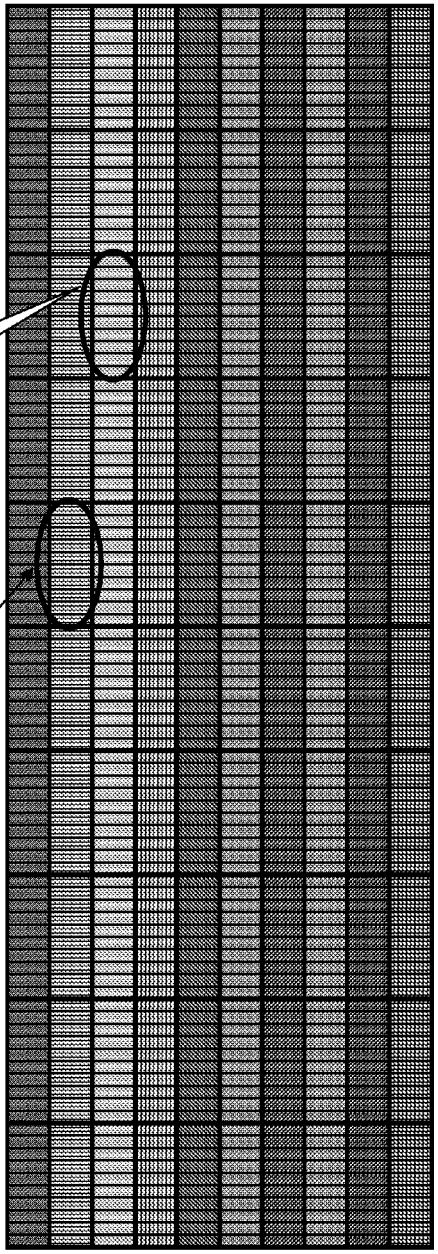

CHANNEL ALLOCATION FOR BURST TRANSMISSION TO A DIVERSITY OF SATELLITES

BACKGROUND OF INVENTION

When two communication devices simultaneously transmit on the same channel, a communication conflict might occur, potentially degrading the receiving probability of one or both of these transmissions. Such communication conflicts are obviously undesired, yet cannot be disregarded in the crowded communication networks which are usually short in bandwidth.

The penalty for such transmission collisions is a lower quality of service, more power consumption and more undesired RF radiation. Therefore, multiple access communication networks employ methods to properly allocate communication channels to devices, in order to avoid such conflicts. Still, due to the high ratio of devices per channel, and to the often unsynchronized transmissions, among different devices and users that share these channels, such conflicts are still an important issue to consider in communication systems.

One communication sector particularly vulnerable to channel allocation conflicts is related to networks comprising a multitude of one-way transmitters that share a relatively small amount of channels. In such networks, transmitters cannot coordinate with each other the allocation of channels, so there is a chance that two such devices will simultaneously transmit on the same channel and interfere with each other. One such particular network that employs millions of one-way communication devices sharing thirty three or less channels is Cospas-Sarsat. Though the scope of the present invention is far beyond that specific system, Cospas-Sarsat is a good example to clarify the need and solution and a particular embodiment disclosed by the present invention, so is specifically enlightened here.

Cospas-Sarsat is a satellite communications system to assist Search and Rescue (SAR) of people in distress, all over the world and at anytime. The system was launched in 1982 by the USA, Canada, France and the Soviet Union (now Russia) and since then, it has been used for thousands of SAR events and has been instrumental in the rescue of over 20,000 lives worldwide. The goal of the system is to detect and locate signals from distress radio beacons and forward these data to ground stations, in order to support all organizations in the world with responsibility for SAR operations, whether at sea, in the air or on land. The system uses spacecraft—Low Earth Orbit (LEO); Geostationary (GEO) satellites; and in the future also Medium Earth Orbit (MEO); as well as ground facilities. Cospas-Sarsat radio beacons transmit in the 406 MHz band (and 121.5 MHz until 2009). The position of the beacon is determined either by the Doppler shift of the received beacon signal or by position data provided by an embedded Global Navigation Satellite System (GNSS) decoder (receiver), integrated with the radio beacon. A detailed description of the Cospas-Sarsat System is provided in the document "Introduction to the Cospas-Sarsat System, C/S G.003", which can be accessed through the following link—http://cospas-sarsat.org/Documents/gDocs.htm.

Several types of Cospas-Sarsat beacons are approved for use, differing mainly in their mechanical structure and activation method, customized for different applications: a) Emergency Position Indicating Radio Beacon (EPIRB) for marine use; b) Emergency Locator Transmitter (ELT) for aviation use; and c) Personal Locator Beacon (PLB) for personal and/or terrestrial use.

Cospas-Sarsat beacons are deployed in large quantities, all over the world, sharing a few transmission channels. Further, these distress beacons are activated upon local triggering and their transmissions are not synchronized in time, neither in frequency, with each other (except of a very rough control through a preliminary factory set frequency allocation). A narrow bandwidth is allocated to all these beacons which are usually off, typically for several years, and transmit only in rare occasions, for a short time, normally in periodic bursts for several days. However, as tens and hundreds of thousands of such beacons are deployed, sharing one narrowband channel, simultaneous transmissions might statistically occur, interfering with each other and decreasing the probability of a distress message to be detected. Then, in order to ensure a certain quality of service, i.e. a minimal probability for a distress message to be detected within a specific period of time, the number of transmitters per channel should be limited. Obviously, such a system could be more efficient in exploitation of the allocated spectrum, serve more beacons and/or improve the quality of service if the transmission collision rate could be reduced.

The total bandwidth allocated for Cospas-Sarsat is 100 KHz (406.0-406.1 MHz), divided to 3 KHz bandwidth channels. According to the present art, each beacon is factory set to one of these channels, which cannot be reconfigured in the field. Then, each channel (theoretically 33 channels, however practically much less mainly due to Doppler shift limitations and system overhead) is shared by tens or hundreds of thousands of beacons. When activated (automatically or manually), a Cospas-Sarsat beacon transmits short bursts, each one approximately 0.5 seconds long, every 50 seconds, for several days, until its battery drains. In order to avoid repetitive collisions between two active beacons, a beacon is required to set its transmission cycle to 50+/−2.5 seconds, and the period should be randomized around a mean value of 50 seconds, so that time intervals between transmissions are randomly distributed on the interval 47.5 to 52.5 seconds.

A significant augmentation of the Cospas-Sarsat satellite segment is planed to be implemented in the near future. Accordingly, compatible Cospas-Sarsat payloads will be installed onboard positioning satellites belonging to the Galileo GNSS constellation and possibly also onboard GPS satellites. Galileo, the upcoming European GNSS, is planed to comprise 27 satellites, while the US GPS comprises 24 operational satellites. Each of these systems provides at least four satellites simultaneously in Line of Sight (LOS) with any point on earth, as required for trilateral positioning (fourth satellite usually solves clock ambiguity), i.e. any point on earth will be always in at least four different satellite footprints (service areas) of the Galileo GNSS and another four GPS satellite footprints. Considering also the LEO and GEO satellites that currently cover the earth for this SAR system, it is expected that any beacon on earth will be at any moment in ten or more footprints, which move quickly relatively to the earth surface. Hence, many different intersections of footprints will be introduced on earth surface, enabling beacons on different intersections to communicate with different satellites. For the clarity of this discussion, it is assumed that beacons are featured with omnidirectional antennas, and satellites are installed with wide beam antennas, yet this is definitely not mandatory.

The applicant has proposed a method to improve channel allocation for communication networks, such as Cospas-Sarsat, in "Increasing Channel Capacity of TDMA Transmitters in Satellite based Networks", application Ser. No. 12/046, 509, filed on 12 Mar. 2008. This reference shares with the present invention the aspect of allocating time slots to Time Division Multiple Access (TDMA) transmitters based on their position, yet does not discuss allocation of frequencies and does not address overlapping of satellite footprints, specifically dynamically moving, and a cellular partitioning based on that.

Another aspect of communications vulnerable to channel allocation conflicts is the initial approach of a device to an access point asking for service. Often, a communications network properly allocates operational channels to devices, and well synchronizes these devices in order to avoid collisions. However, before the network allocates these operational channels, devices that initiate a service request do not use said operational channels, which are controlled by the network (or by any administering unit related to that network), but share a pool of service requesting channels. At this preliminary phase, these devices might not be synchronized with each other, for different reasons, such as: random timing of access, no peer to peer connection; communication peaks; etc. Improving the channel allocation method for devices requesting service, could enable a faster reaction of the network to such requests, and/or managing more devices requesting service, over the same channels/bandwidth.

U.S. Pat. No. 6,115,371 to Berstis (IBM) discloses a satellite uplink separation using time multiplexed global positioning system cell location beacon system. This method, for allocating bandwidth to devices seeking to initiate contact with a communication service, suggests using time slots according to self location determined by GPS.

U.S. Pat. No. 7,304,963 to Amouris discloses a method and system for dynamically allocating a set of broadcast TDMA channels to a network of transceiver nodes. This method is based on timeslot partitioning and geographic location.

U.S. Pat. No. 7,082,111 to Amouris discloses a method and system for dynamically allocating time slots of a common TDMA broadcast channel to a network of transceiver nodes. This invention allocates time slots to TDMA devices according to their geographical position.

Yet, none of these three US patents addresses intersections of footprints, i.e. areas served by several satellites, and neither Berstis nor Amouris suggests discriminating between devices placed in areas served by a different number of satellites, for channel allocation purposes.

U.S. Pat. No. 5,268,694 to Jan et al. (MOTOROLA) discloses a method of reusing spectrum on an approximately spherical surface, based on two satellite footprints partially overlapping, each footprint divided to cells. According to Jan, cells located in the intersection of footprints are defined non active, and channels are assigned only to active cells, spacing co-channel cells a predetermined distance apart. Yet, Jan does not address cells contained in other than one or two footprints, and neither suggests allocating active transmission channels to devices in overlapping footprints, specifically not according to the number of overlapping footprints.

WO/2001/095522 to Yung, Hagen and Chang, (HUGHES ELECTRONICS CORPORATION) discloses a RESOURCE ALLOCATION METHOD IN A SATELLITE DIVERSITY SYSTEM. This invention teaches allocating system resources to user terminals communicating with a multiple of satellites, wherein a ground hub compensates for differential propagation delays to any one of these remote users. Yet, this invention does not consider the various satellite footprint intersections as a basis for resource allocation.

European Patent EP0935351 to Bains, Navjit Singh (ICO Services) discloses a Radio resource management in a mobile satellite telephone system. This method teaches allocating radio resources to a plurality of mobile user terminals in a satellite mobile telephone system, in which a position of each of the user terminals within the footprint of a given satellite is capable of being classified, specifically denying resources from terminals placed at the edge of the satellite footprint, which obtain a significant path delay for a signal to be communicated to the given satellite. Still, this method does not address intersections of footprints for the purpose of resource allocation.

The present art methods described above have not yet provided satisfactory solutions to the problem of allocating communication channels to devices configured to transmit bursts of data to a diversity of satellites, specifically non geostationary satellites, sharing relatively few channels, particularly when having a certain amount of data transmission redundancy.

It is an object of the present invention to provide a system and method for allocating communication channels to devices configured to communicate with a diversity of satellites, particularly non geostationary satellites, reducing transmission collisions and exploiting the allocated bandwidth.

It is also an object of the present invention to provide a system and method for allocating communication channels to devices configured to communicate with non geostationary satellites, particularly devices that have no means to communicate with each other or cannot coordinate channel allocation among them.

It is another object of the present invention to provide a system and method for allocating momentary communication channels to devices configured to communicate with non geostationary satellites, in particular devices which are distress radio beacons.

It is yet another object of the present invention to provide a method for improving present or/and future systems for Search and Rescue (SAR), such as Cospas-Sarsat and Galileo.

It is as well an object of the present invention to provide a system and method for allocating momentary communication channels to devices configured to communicate with non geostationary satellites, based on the various intersections of overlapping footprints of satellites on the earth surface.

It is still an object of the present invention to provide a system and method for allocating communication channels to devices configured to communicate with non geostationary satellites, based on time synchronization and positioning information provided by a GNSS such as GPS or Galileo or GLONASS.

It is also an object of the present invention to provide a system and method for allocating communication channels to devices configured to communicate with non geostationary satellites, based on additional data such as statistics of geographical distribution of devices, redundancy of data, location variation and acknowledgement of transmissions.

It is still another object of the present invention to provide a system and method for allocating communication channels to devices configured to communicate with non geostationary satellites, minimizing cost and size and power consumption of said devices.

It is nonetheless an object of the present invention to provide an apparatus and method for allocating communication channels to devices configured to communicate with non geostationary satellites, wherein said channels are either time slots for Time Division Multiple Access (TDMA); or frequencies for Frequency Division Multiple Access (FDMA); or digital codes for Code Division Multiple Access (CDMA); or a combination thereof.

Other objects and advantages of the invention will become apparent as the description proceeds.

SUMMARY OF INVENTION

The invention is directed to a method for allocating transmission channels to a plurality of devices configured to communicate with a diversity of satellites, comprising, at each device, the steps of:

a) determining the current time and self location via a Global Navigation Satellite System (GNSS);

b) determining the current service areas ("footprints") of said diversity of satellites on earth surface;

c) defining as a mega-cell each intersection of footprints which is not divided to further intersections;

d) determining a transmission cycle divided to time slots, synchronized with said GNSS signals;

e) allocating channels and time slots to each mega-cell, wherein channels and time slots are reused in different mega-cells, and at least for two mega-cells, fewer time slots are allocated to the mega-cell served by more satellites;

f) dividing each mega-cell into cells, at least one cell in a mega-cell;

g) allocating different channels and/or different time slots to different cells in a mega-cell, from those allocated to the corresponding mega-cell;

h) selecting a specific channel and a specific time slot from those allocated to the corresponding cell, according to at least one of: random or pseudo-random selection; unique identification data (ID) stored at each device; classification data stored and/or acquired at each device; the nature of data to be transmitted; signal/control input; current geographical location; coordination with other devices.

Defining a mega-cell as an intersection of footprints which is not divided to further intersections means that all points in a mega-cell, i.e. all devices placed in a mega-cell, are in Line of Sight (LOS) with, and served by, exactly the same satellites. The disclosed invention is not limited to one antenna/beam/footprint per satellite, yet for clarification purposes, one footprint per satellite is assumed. Then, as a skilled person may appreciate, any two adjacent mega-cells are served by at least one different satellite; otherwise these mega-cells would have been merged to one, following the mega-cell definition. Moreover, according to this cellular partitioning, any mega-cell is served by a specific set of satellites, and all its adjacent mega-cells are served by this set of satellites plus or minus one satellite. In other words, any two adjacent mega-cells are served by a different number of satellites, where devices in the mega-cell served by more satellites are in LOS with all the satellites serving the adjacent mega-cell, and with one specific satellite more. Hence, if devices in adjacent mega-cells simultaneously transmit on the same channel, there is a significant chance that the transmission from the mega-cell served by fewer satellites will be blocked, while the transmission from the mega-cell served by more satellites will be successfully detected by one satellite.

Actually, as a skilled person would probably appreciate, for any two mega-cells, devices placed in a mega-cell covered by more footprints basically obtain a better probability to be detected than devices placed in a mega-cell served by fewer satellites. Ultimately, transmissions from mega-cells served by the largest number of satellites, compared to all other mega-cells, at a specific moment, obtain the best detection probability, at least according to this aspect.

As already mentioned, adjacent mega-cells are served by one different satellite. Then, as mega-cells are more distant from each other, they are usually less correlated regarding to satellites, so devices placed in distant mega-cells less interfere with each other. Ultimately, mega-cells which are more than the largest footprint diameter away from each other, do not share any same satellites; moreover, as a skilled person may realize, according to the disclosed cellular partitioning, each of any two non adjacent mega-cells is probably served by at least one satellite which does not serve the other mega-cell, so two devices placed in non adjacent mega-cells will probably be detectable even if transmitting simultaneously on the same channel; in particular, mega-cells served by the largest number of satellites, at a specific moment, are obviously non adjacent mega-cells, and probably do not share exactly the same satellites. Hence, a transmitter placed in a mega-cell served by the largest number of satellites is practically not interfered by any transmitter placed in any other mega-cell.

Then, in order to improve the transmission probability of the underprivileged devices, placed in mega-cells covered by fewer satellites compared to adjacent mega-cells, the present invention suggests allocating fewer time slots to mega-cells served by more satellites, and particularly to mega-cells momentarily served by the largest number of satellites. This ensures that devices placed in mega-cells served by more satellites will less interfere with devices placed in nearby mega-cells served by fewer satellites. Since devices placed in mega-cells served by more satellites have a better chance to be detected, then reducing the number of allocated time slots for these mega-cells provides a sort of equalization, sharing the network resources more evenly among devices. This strategy might have a trade off, since the detection probability for devices placed in the same mega-cell allocated with fewer time slots might decrease, yet the probability for this case is relatively smaller compared to other cases which are improved by the present invention.

The current method can be further refined, by dividing each mega-cell into cells and allocating different channels and/or different time slots to different cells in a mega-cell, from those allocated to the corresponding mega-cell. A geographically uniformed cellular partitioning is clearly effective if devices are geographically distributed more or less uniformly in mega-cells. Then, there is a good chance that different devices will be placed in different cells, so will use different channels and/or different time slots and will not interfere with each other. Otherwise, this secondary partitioning to cells may take into consideration further parameters, such as the statistics of the geographical density of devices (i.e. number of devices per area) and/or number of devices per cell. Then, cells that are statistically denser with devices, e.g. in urban areas, can be defined to be smaller, in order to keep a substantially similar number of channels and/or time slots per same number of devices. Similarly, cells which statistically contain more devices, e.g. near ports or traffic hubs, can be allocated with more channels and/or time slots, allocating a substantially similar number of channels and/or time slots per devices.

Then, in the next step, a specific channel and a specific time slot are selected from those allocated to the corresponding cell, according to at least one of: random or pseudo-random selection; unique identification data (ID) stored at each device; classification data stored and/or acquired at each device; the nature of data to be transmitted; signal/control input; current geographical location; coordination with other devices. The skilled person may note that in cases where said devices cannot communicate with each other or are not aware of each other and cannot coordinate the channel allocation among them, the present invention provides some "open loop" techniques to reduce the chance for a transmission collision, such as a random selection. Also, some of these techniques may provide a statistical advantage to specific devices, or specific types of devices, or specific types of messages, or specific types of inputs to devices, as might be required by different applications. Also, a third geographical partitioning may be performed, dividing cells to finer sectors and allocating a specific channel and specific time slot to each such sector. Then, "close loop" techniques may provide even less channel conflicts and transmission collisions when nearby devices, typically placed in the same cell, are able to coordinate channel allocation among them.

In the scope of the present invention, communication channels may be of several kinds, including: time slots for Time Division Multiple Access (TDMA); frequencies for Frequency Division Multiple Access (FDMA); codes for Code Division Multiple Access (CDMA); or a combination thereof. For example, according to one embodiment, devices use a fixed frequency, and can only manipulate the time of transmission, i.e. allocate and select time slots. According to another embodiment, devices can set, during operation, the transmission frequency as well as the transmission time, so can select a combination of frequency and time slot, from a pool of frequencies and time slots.

The GNSS in the scope of this invention is preferably the presently operative US GPS, however may be of other types, such as the upcoming European Galileo; the Russian GLONASS (or GLONAS); the Chinese COMPASS; the Indian IRNSS, or a combination thereof. As a person skill in the art may appreciate, different GNSS receivers could be coupled to different communication devices, according to the present invention, as long as such a receiver provides accurate timing signals and accurate timing and position data.

Non geostationary satellites provide footprints which are dynamically moving on the earth surface. In order to determine these footprints, a device may use the momentary spatial coordinates of every satellite and of the earth center, as well as the earth radius (assuming a spherical earth). The satellites coordinates may be derived, based on the current time reading acquired from the coupled GNSS receiver, according to records stating the satellites position and/or almanac and/or ephemeris, which may be partially or entirely stored in the memory of each device or/and received at said device. For example, positioning satellites as the GPS periodically transmit these data, and more often transmit their spatial position coordinates, embedded in the navigation messages. For global navigation and location purposes, the earth center is usually the origin point of a spatial coordinate system, even though it is said that the earth is orbiting around the sun. Obviously, in case that the device can detect signals transmitted by a satellite, this is a clear indication for being in this satellite footprint.

Having the satellite spatial coordinates, in addition to the direction and width of the satellite antenna beam, as well as the spatial coordinates of the earth center and the earth radius (or a more accurate mathematical model of the geoid), may be used to calculate this satellite communication footprint on the earth surface, as well known in the art.

Typically, the dynamically moving footprints of non-geostationary satellites provide, according to the present method, a dynamically cellular partitioning and consequently a dynamic channel allocation. Hence, this channel allocation is effectively valid for a short period, so typically suitable for relatively short periods. In one embodiment of the disclosed method, this channel allocation is applied by devices which transmit a service request, before been allocated with operational channels that are administered by the network or system. In this case, the requesting devices may share a pool of channels for this preliminary phase of communications, from which the disclosed method can function. Then, upon establishing an initial contact with a satellite, the system may take control and allocate a different channel to the requesting device.

In a second embodiment of the disclosed method, this channel allocation is applied by devices that periodically transmit data packets, and for each transmission a channel and/or time slot is selected by each device, according to the present method. A typical relevant application is a Search and Rescue (SAR) satellite system, such as Cospas-Sarsat, employing distress radio beacons. This system is basically allocated (according to international regulations) with 33 frequency channels (though not all operational), and compatible beacons placed in active mode are configured to transmits short bursts of about 0.5 seconds each, every transmission cycle of 50 seconds. The disclosed method may then be applied on a subset of these 33 channels and 100 possible time slots (theoretically a pool of 3300 orthogonal selections), in order to improve the system capacity and/or quality of service.

Typically, a device according to the present invention may comprise unique identification data (ID), and be configured to transmit said ID along with data representing its location. This is particularly relevant to location systems and applications. In such cases, said device may be attached to an object to be located, such as: a person, animal, pet, vehicle, weapon, ammunition, valuable asset and so on.

The current method can be further refined and further improve the network capacity and/or quality of service, by reducing the collision rate among devices, in specific scenarii. One scenario is related to location applications, where the most important data transmitted by a device is its position. Then, if the position of a device does not change significantly between successive reports, this device may skip one or more transmission cycles, avoiding transmission of redundant data and reducing the chance to interfere with another device. This logic may be broaden to similar scenarii, so a device skips a transmission cycle if other type of data to be transmitted is substantially the same as previously transmitted, for example a sensor reading that did not change lately.

Another scenario is related to systems which provide transmission acknowledgement. In such a case, if a device is configured to periodically transmit data packets, as a distress radio beacon, and if one transmission is been acknowledged, then this device may skip one or more transmission cycles in order to reduce a potential transmission collision with another device, knowing that its own message was already been delivered.

The invention is further directed to a computer program product in a computer readable medium for a method for allocating transmission channels to a plurality of devices configured to communicate with a diversity of satellites, comprising, for each device, the steps of:

a) determining the current time and self location via a Global Navigation Satellite System (GNSS);

b) determining the current service areas ("footprints") of said diversity of satellites on earth surface;

c) defining as a mega-cell each intersection of footprints which is not divided to further intersections;

d) determining a transmission cycle divided to time slots, synchronized with said GNSS signals;

e) allocating channels and time slots to each mega-cell, wherein channels and time slots are reused in different mega-cells, and at least for two mega-cells, fewer time slots are allocated to the mega-cell served by more satellites;

f) dividing each mega-cell into cells, at least one cell in a mega-cell;

g) allocating different channels and/or different time slots to different cells in a mega-cell, from those allocated to the corresponding mega-cell;

h) selecting a specific channel and a specific time slot from those allocated to the corresponding cell, according to at least one of: random or pseudo-random selection; unique identification data (ID) stored at each device; classification data stored and/or acquired at each device; the nature of data to be transmitted; signal/control input; current geographical location; coordination with other devices.

This computer program product may refer to channels which are at least: time slots for Time Division Multiple Access (TDMA); or frequencies for Frequency Division Multiple Access (FDMA); or codes for Code Division Multiple Access (CDMA); or a combination thereof.

According to this computer program product, cells statistically denser with devices can be defined smaller, and/or cells statistically with more devices can be allocated with more channels and/or time slots.

Further, this computer program product may refer to a device comprising unique identification data (ID), and configured to transmit said ID along with data representing its location.

Then, according to this computer program, a device may be configured to skip at least one transmission cycle if data to be transmitted is substantially the same as previously transmitted, or/and if a previous transmission was acknowledged.

The invention is also directed to a communication system and device for allocating transmission channels to a plurality of such devices configured to communicate with a diversity of satellites, each of said devices comprising at least an RF transmitter coupled to a Global Navigation Satellite System (GNSS) receiver, wherein each device is configured to:

a) determine the current time and self location via said GNSS;

b) determine the current service areas ("footprints") of said diversity of satellites on earth surface;

c) define as a mega-cell each intersection of footprints which is not divided to further intersections;

d) determine a transmission cycle divided to time slots, synchronized with said GNSS signals;

e) allocate channels and time slots to each mega-cell, wherein channels and time slots are reused in different mega-cells, and at least for two mega-cells, fewer time slots are allocated to the mega-cell served by more satellites;

f) divide each mega-cell into cells, at least one cell in a mega-cell;

g) allocate different channels and/or different time slots to different cells in a mega-cell, from those allocated to the corresponding mega-cell;

h) select a specific channel and a specific time slot from those allocated to the corresponding cell, according to at least one of: random or pseudo-random selection; unique identification data (ID) stored at each device; classification data stored and/or acquired at each device; the nature of data to be transmitted; signal/control input; current geographical location; coordination with other devices.

For this communication system and this device, said channels are at least: time slots for Time Division Multiple Access (TDMA); or frequencies for Frequency Division Multiple Access (FDMA); or codes for Code Division Multiple Access (CDMA); or a combination thereof.

Further, for this communication system and this device, cells statistically denser with devices may be defined to be smaller, and/or cells statistically with more devices may be allocated with more channels and/or time slots.

Also, for this communication system and this device, each of said devices may comprise unique identification data (ID), and configured to transmit said ID along with data representing their location.

Then, each of said devices may be attached to an object to be located, such as: a person (particularly the young, the old and the disabled), animal, pet, vehicle, weapon, ammunition, valuable asset.

In addition, said device may be configured to skip at least one transmission cycle if data to be transmitted is substantially the same as previously transmitted, or/and if a previous transmission was acknowledged.

Other objects and advantages of the invention will become apparent as the description proceeds.

BRIEF DESCRIPTION OF DRAWINGS

The above and other characteristics and advantages of the invention will be better understood through the following illustrative and non-limitative detailed description of preferred embodiments thereof, with reference to the appended drawings, wherein:

FIG. 1 illustrates an Overview of a System for Burst Transmission to a Diversity of Satellites. The figure shows six satellites orbiting around the globe, detecting a transmission of a device (not shown) placed in Africa, while five of these satellite also detect a transmission of another device (not shown) placed in the Atlantic Ocean.

FIG. 2 shows a Block Diagram of a Device for Burst Transmission to a Diversity of (SAR) Satellites, according to a preferred embodiment of the present invention. It shows a microcontroller (including RAM and EPROM memory, not specifically depicted), coupled to a GNSS (e.g. GPS) receiver. The microcontroller is also coupled to an RF transmitter and an RF synthesizer.

FIGS. 3 (3a and 3b) illustrates the footprint of a satellite on earth surface, and is divided to FIG. 3a and FIG. 3b.

FIG. 3a shows an isometric view of the earth, and a satellite at the zenith of a point which is the center of this satellite footprint on the earth surface.

FIG. 3b shows a sectional view of the earth, and a satellite at a distance of 4 times the earth radius from earth center. The radius of the footprint is an arc of an angle denoted as θ.

FIG. 4 illustrates overlapping footprints of 24 satellites on the earth surface. This illustration of the earth surface is only two dimensional, and definitely not according to an accurate geographical projection. Yet, it depicts the way that overlapping footprints create intersections, which are the basis for the present invention cellular partitioning.

FIG. 5 shows a flow chart illustrating the process of channel allocation according to the present invention, to be periodically implemented by each device, step by step.

FIG. 6 illustrates Allocation of channels and time slots to cells in A-mega-cells (left side) and B-mega-cells or C-mage-cells (right side). Each side of the picture is a table comprised of 100 rows representing 100 time slots, and 10 columns representing 10 channels. Each combination of ten rows and one column represents a unique allocation of [channel+10 time slots] to a specific cell.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The invention is directed to a method for allocating transmission channels to a plurality of devices configured to communicate with a diversity of satellites, comprising, at each device, the steps of:

a) determining the current time and self location via a Global Navigation Satellite System (GNSS);

b) determining the current service areas ("footprints") of said diversity of satellites on earth surface;

c) defining as a mega-cell each intersection of footprints which is not divided to further intersections;

d) determining a transmission cycle divided to time slots, synchronized with said GNSS signals;

e) allocating channels and time slots to each mega-cell, wherein channels and time slots are reused in different mega-cells, and at least for two mega-cells, fewer time slots are allocated to the mega-cell served by more satellites;

f) dividing each mega-cell into cells, at least one cell in a mega-cell;

g) allocating different channels and/or different time slots to different cells in a mega-cell, from those allocated to the corresponding mega-cell;

h) selecting a specific channel and a specific time slot from those allocated to the corresponding cell, according to at least one of: random or pseudo-random selection; unique identification data (ID) stored at each device; classification data stored and/or acquired at each device; the nature of data to be transmitted; signal/control input; current geographical location; coordination with other devices.

Considering the term "channels", the preferred embodiment of the present invention refers to frequency channels. Another embodiment to be discussed following referres to channels which are time slots, as it deals with devices with a single factory set frequency (e.g. present Cospas-Sarsat beacons) and suggests dynamically allocation only of time slots. Furthermore, in the scope of this invention, "channels" may be time slots for Time Division Multiple Access (TDMA) or frequencies for Frequency Division Multiple Access (FDMA), as well as codes for Code Division Multiple Access (CDMA) or any combination thereof.

FIG. 1 shows an Overview of a System for Burst Transmission to a Diversity of Satellites. The globe is illustrated in this figure, six satellites orbiting around it, receiving a transmission from a device (not shown) placed in Africa. Five of these satellite are also shown receiving a transmission from another device (nor shown), placed in the Atlantic Ocean. In a preferred embodiment of the present invention, these and similar devices are distress radio beacons and said diversity of satellites (represented in FIG. 1 by six satellites) are 24 Medium Earth Orbiting (MEO) satellites, typically covering any point on earth surface with several overlapping footprints. For example, FIG. 1 indicates that the device placed in the Atlantic is in five overlapping footprints while the device placed in Africa is covered by six overlapping footprints. Preferably, each of said diversity of satellites carries onboard two types of payloads: a) positioning; mainly for transmitting signals enabling location determination via a trilateral calculation; and b) SAR; mainly for receiving distress signals from radio beacons by the earth surface and relay these signals or related data to earth stations. Practically, these satellites can be part of the upcoming European Galileo system which is essentially a positioning system but also augments the Cospas-Sarsat SAR system. Another embodiment may be based on the future US GPS constellation, which is presently a positioning system yet planned to be upgraded to support SAR such as Cospas-Sarsat. Both GPS and Galileo employ a trilateral positioning method, so at least 4 satellites of each of these constellations are required to be in LOS with any receiver whose position is to be determined. Practically, each of these constellations is designed to provide at least 6 satellites in LOS (i.e. six overlapping footprints), almost anytime, with almost any point on the earth surface, but usually even more than six satellites, to provide a good (low) Geometric Dilution of Precision (GDOP) at each receiving device.

FIG. 2 depicts a Block Diagram of a Device for Burst Transmission to a Diversity of SAR Satellites, according to the preferred embodiment of the present invention. As shown in FIG. 2, each of said devices comprises an RF transmitter, on the 406 MHz band, basically according to the specifications of Cospas-Sarsat—http://www.cospas-sarsat.org/DocumentsTSeries/T1NOV1_07_CompleteDoc.pdf. Each of said RF transmitters is coupled to an RF synthesizer, and to a microcontroller. The microcontroller is also coupled to a GNSS decoder/receiver which is preferably a Galileo or a GPS receiver. These basic blocks might be part of present art Cospas-Sarsat beacons (such as EPIRBs, PLBs or ELTs), and theoretically, the implementation of this preferred embodiment may be based on present art beacons, customized according to the disclosed method. In many cases, this customization can be implemented in software, largely enabling using current Cospas-Sarsat beacon's hardware. Many present art beacons comprise a factory set local oscillator, not a programmable synthesizer, and such a single frequency device can be employed according to a different embodiment of the present method, where frequency channels are fixed at each device and only time slots are been dynamically allocated. Yet, the preferred embodiment requires each device to comprise a programmable RF synthesizer, coupled to the internal processor, as shown in FIG. 2, enabling also a dynamic frequency channel allocation. The microcontroller is then configured to select a transmission channel from the 33 channels (or a sub set of these channels) in the range of 406.0-406.1 MHz which are allocated by the regulator to this SAR system. Hence, a person skilled in the art wishing to build a device according to the preferred embodiment of the present invention, can choose either strategy: a design based on the component level, i.e. using off the shelf integrated circuits (ICs), or a design starting with higher integrated blocks, i.e. using/modifying radio beacons and/or related printed circuit boards (PCBs).

Cospas-Sarsat radio beacons and GPS receivers are items mostly available on the market, by a considerable number of manufacturers, and very well documented (specific products as well as systems—Cospas-Sarsat and GPS), in a way that a person skilled in the art, particularly manufacturers of such beacons, can utilize in the scope of the present invention. A design starting from crash, can utilize components which are also popular in the market, such as the Texas Instruments (TI) MSP430 Ultra-Low Power Microcontrollers or the TI family of low power radio ICs, CC1101/CC1110/CC1111, which can be used as RF transmitters and/or RF synthesizers. Data sheets and specifications can be found at—http://www.ti.com/ and http://focus.ti.com/general/docs/. Further circuits and components, such as those required to implement the biphase modem compatible with Cospas-Sarsat, are also well known in the art.

According to the preferred embodiment, each active device (i.e. radio beacon in distress mode), transmits no more than one short packet of data every transmission cycle. This cycle is divided to time slots, to improve the channel capacity, up to twice compared to unsynchronized transmissions, due to less transmission collisions among transmitters. The slotted method is well practiced in the art, as in the "Slotted Aloha" protocol, originally used for satellite communications in the Pacific Ocean region.

FIG. 5 shows a step by step Channel Allocation Flow Chart, to be conducted at each device, every transmission cycle, according to the preferred embodiment of the present invention. These steps comprise of:

a) determining the current time and self location, based on said GNSS signals and data; this is typically done by the microcontroller and the coupled GNSS receiver, as well practiced in the art; the preferred embodiment suggests employing either GPS or Galileo as the GNSS (also know as SPS—Satellite Positioning System); yet, the present invention may also be related to other types of GNSS, presently operating or futuristic, such as the Russian GLONASS (or GLONAS), the Chinese COMPASS, the Indian IRNSS or a combination thereof. Furthermore, a skilled person may appreciate that any other positioning system, been satellite based or not, may be employed in conjunction with the present invention, as long as it provides accurate positioning and timing information.

b) determining the current service area ("footprint") of each of said diversity of satellites, as following:

b1) determining each satellite spatial coordinates, by receiving via the coupled GNSS receiver the satellites almanac and ephemeris and for satellites in LOS also receiving the position coordinates embedded in the frequently transmitted navigation messages; also, the satellites almanac and ephemeris may be stored in the device's memory, enabling, at a known time, to determine the spatial position of the satellites.

b2) determining the current footprints, through a trigonometric calculation, based on the ECEF (Earth Centered Earth Fixed) satellite coordinates, assuming that the earth center is in the origin point (0, 0, 0) of this Cartesian coordinate system, and using the earth radius (assuming a sphere) or a more accurate mathematical model of the geoid. FIG. 3 illustrates a satellite orbiting around the globe, where FIG. 3a shows an isometric view of the satellite footprint on earth surface, and FIG. 3b shows a sectional view of the earth, and a satellite at a distance of 4 times the earth radius from earth center. The radius of the footprint is an arc of an angle denoted as θ (FIG. 3b). A skilled person may probably note that cos θ=¼, so θ≈75°, and such a footprint covers about one third of the earth surface; also, the coordinates of the center of this footprint may be determined noting that this point is on the line connecting the satellite with earth center, distant one earth radius away from the earth center; clearly, the footprint center and its radius on the surface of the earth uniquely define the footprint perimeter. According to a second embodiment, said devices comprise also a receiver configured to receive signals transmitted by said diversity of satellites, so the indication that a device is in the footprint of a satellite is simply detecting a signal from this satellite at this device. Furthermore, since according to the preferred embodiment, the same satellites transmit positioning signals and receive the (distress) devices' transmissions, determining the satellites footprints is straightforwardly done by detecting the navigation signals transmitted by these satellites, i.e. almanac and ephemeris (typically indicating the position of all the constellation satellites) and position, at the GNSS receiver coupled to every device;

c) defining as a mega-cell each intersection of footprints which is not divided to further intersections and recording how many footprints currently overlap each mega-cell. FIG. 4 is an illustration of overlapping footprints of 24 satellites on the earth surface. Obviously, it is only a two dimensional illustration, not even a cartographic projection. Still, it basically depicts the overlapping footprints and intersections which define the mega-cells, according to the present invention. Since preferably, said diversity of satellites are 24 MEO satellites, orbiting substantially evenly around the earth, at an altitude of about 20K Kms above earth surface (i.e. about 4 times the earth radius from the earth center), each of these satellite footprints covers approximately ⅓ of the entire earth surface, as shown in FIG. 3, thus these 24 satellite footprints accumulatively cover the earth surface about eight times, i.e. averagely provide eight satellites in LOS with any point on the earth. As shown in FIG. 4, such satellite footprints create many intersections. The current method considers the smallest intersections, which are not further divided by any footprint circumference, and defines each of these intersections as a mega-cell. FIG. 4 shows some mega-cells covered by 6 footprints, denoted as A-mega-cells (the darkest intersections); some mega-cells covered by 5 footprints, denoted as B-mega-cells; and others covered by 4 overlapping footprints, denoted as C-mega-cells. As already indicated, a GNSS as Galileo or GPS ensures at least 4 satellites always in LOS with any point on earth, and usually provides many more; the example illustrated in FIG. 4 indicates the maximum number of satellites covering any mega-cell as six;

d) determining a transmission cycle of 50 seconds, divided to 100 time slots of 0.5 seconds each, synchronized with said GNSS signals; preferably, said GNSS signals are provided by the coupled GNSS decoder, and typically are: a 1 Pulse Per Second (PPS) signal and Time of Day (TOD) message (i.e. the current date and time). Actually, the propagation delay variation of transmissions traveling different time periods to the same satellite is also to be considered, in order to avoid collision of transmissions starting at different time slots. This might require decreasing the maximum packet transmission period by about 20 milliseconds;

e) allocating channels and time slots to each mega-cell, wherein channels and time slots are reused in different mega-cells but at least for two mega-cells, fewer time slots are allocated to the mega-cell served by more satellites; in the preferred embodiment, all channels are allocated to all mega-cells, and all time slots are allocated to all mega-cells served by less than the largest number of satellites, while fewer time slots are allocated to the mega-cells served by the largest number of satellites. FIG. 6 illustrates Allocation of channels and time slots to mega-cells and cells according to this preferred embodiment. The left side of FIG. 6 depicts the channels and time slots allocated to A-mega-cells, and the right side depicts the allocation to B-mega-cells/C-mage-cells. This figure shows also the allocation of channels and time slots to cells in mega-cells, which will be discussed later. The step related to the mega-cell allocation, is conducted as following:

e1) determining which mega-cells are served by the maximum number of satellites; following the example depicted in FIG. 4, the maximum number of satellites serving any mega-cell is six, and these mega-cells are denoted A-mega-cells; there are six A-mega-cells in the area marked by the thick black circle (still in FIG. 4), and about a total of 40 such A-mega-cells on the entire earth surface, as a rough extrapolation based on this FIG. 4 example;

e2) Determining a pool of channels available for transmission, preferably 10 channels in the range of 406.0-406.1 MHz, each channel 3 KHz wide; following the non limiting example illustrated in FIG. 6, the center frequencies of these channels are: I=406.005 MHz; II=406.015 MHz; III=406.025 MHz; . . . ; X=406.095 MHz; each of these channels is represented by a column in each of the left and right tables in FIG. 6;

e3) allocating all the 10 pool channels to each and every mega-cell; as a skilled person may observe in both tables in FIG. 6, all 10 channels are marked (each channel is marked by a different graphical pattern) available for A-mega-cell and B-mega-cells and C-mega-cells;

e4) allocating all 100 transmission time slots per cycle to all B-mega-cells and all C-mega-cells; as a skilled person may observe, all 100 time slots (each time slot is represented by a different row) are marked available (by a gray color) for B-mega-cells and C-mega-cells, in the right table in FIG. 6;

e5) allocating only 90 time slots per cycle to A-mega-cells; according to the non limiting example shown in the left table in FIG. 6, each $10^{th}$ time slot ($10^{th}$, $20^{th}$, $30^{th}$, . . . , $100^{th}$) is denied from A-mega-cells.

f) dividing each mega-cell into cells; preferably, each mega-cell is divided to 100 equal in area cells; in other cases, in order to provide an even number of devices per cell, cells may be defined in different sizes, to compensate for a non uniformly geographical distribution of devices. For example, cells in areas known to be statistically denser with devices, like urban areas or areas populated with many devices (not necessarily related to people, such as remote sensors) may be determined to be smaller g) allocating different channels and/or different time slots to different cells in a mega-cell, from those allocated to the corresponding mega-cell; basically, each cell in a mega-cell may be allocated with the same number of channels/time slots, yet it is possible to compensate for non uniform distribution of devices per cell with allocating more channels and/or time slots to statistically more populated cells; still, according to the preferred embodiment, channels/time slots allocated to a mega-cell are divided evenly among the cells in this mega-cell, as following:

g1) each cell in a B-mega-cell or a C-mega-cell is allocated with 1 channel and 10 time slots, wherein each channel is shared by 10 cells in a mega-cell (a column in FIG. 6) and each of these cells is allocated with different time slots (groups of ten consecutive rows along a column in FIG. 6);

g2) each cell in A-mega-cells is principally allocated with 1 channel and 9 time slots (depicted in the left table in FIG. 6 as a section of ten consecutive rows along one column, where only the first 9 rows in a section are colored gray); yet practically, each cell is allocated with a basic set of 10 time slots (i.e. all ten time slots depicted in said section of the left table, both the 9 gray colored and 1 white colored), however is denied one of these time slots (the white colored);

h) selecting a specific channel and a specific time slot from those allocated to the corresponding cell, preferably in a pseudo-random way. According to this preferred embodiment, each cell is allocated with only one channel, so the random selection is performed only on the allocated time slots.

Practically, each active device randomly selects a time slot from the basic set of 10 time slots allocated to its cell, and for A-mega-cells, if the selected time slot happens to be denied from this cell (i.e. the $10^{th}$ time slot), this device does not transmit during this transmission cycle.

In other embodiments, this selection can be done based on a unique identification data (ID) stored at each device (e.g. the ID modulo the number of channels and/or tome slots); or a classification data stored and/or acquired at each device (e.g. channels served for "more important" devices); or according to the nature of data to be transmitted (e.g. channels served for emergency messages); or based on a signal/control input (e.g. channels served for SOS messaging, activated by a user); or current geographical location (e.g. separation of channels according to a finer cellular partitioning);

According to the second embodiment mentioned above, the selection of a specific channel and a specific time slot from those allocated to the corresponding cell is done at each device with coordination with other devices. As already indicated, in this second embodiment, devices comprise also RF receivers (beyond GNSS receivers), so nearby devices are able to communicate with each other and negotiate channels, in order to refine the channel allocation among them and further reduce potential transmission collisions at the satellite receivers.

It is interesting to analyze the contribution of the disclosed method to the message receive probability per transmission cycle, i.e. the chance to receive a message from a device, at least by one of the receiving satellites, in a transmission cycle period. Observing FIG. 4, focusing on the area of the footprint marked by a thick black circle, a skilled person may detect 38 mega-cells: a) 6×A-type mega-cells; b) 20×B-type mega-cells (basically four B-mega-cells are adjacent to each A-mega-cell, but the present analysis counts only mega-cells placed inside the thick black circle); and c) 12×C-type mega-cells (six placed on the upper part of the marked footprint and six in the lower part); some six smaller intersections placed by the horizontal diameter of the marked footprint are neglected, for the purpose of this discussion. A skilled person may observe that for any two non adjacent of these 38 mega-cells, each mega-cell is covered at least by one footprint that does not cover the other. In other words, two devices in this area, placed in any non adjacent mega-cells, may be detected by at least one satellite each, even if both devices are simultaneously transmitting on the same channel. For satellites that cover the earth surface substantially uniformly, as depicted in FIG. 4, such communication isolation is probably provided all over the earth surface. Hence, upon defining mega-cells as intersections of footprints which are not divided to further intersections, as indicated in step (c) of FIG. 5, communication conflicts may be mainly due only to active devices placed in the same mega-cell or in adjacent (sharing a bordering line) mega-cells. Furthermore, as already mentioned, adjacent mega-cells differ by exactly one satellite footprint, and devices placed in a mega-cell formed by more footprints are not blocked by devices in an adjacent mega-cell covered by one footprint less; therefore, post said step (c), an active device might be interfered mainly only by another device placed in the same mega-cell or a device in an adjacent mega-cell which is covered by more footprints.

Then, the partitioning of mega-cells to cells and allocation of different channels/time slot to different cells in a mega-cell, as indicated in FIG. 5 steps (f)-(g), further limit potential communication conflicts only to devices placed in cells that are allocated with the same channels and time slots, either in the same mega-cell or in adjacent mega-cells. Following, cells which are allocated with the same channels/time slots (even related to A-mega-cells, where cells are denied one time slot of ten) are denoted as "matching cells".

Consequently, for two active devices, transmission collision may occur mainly only in the following scenarii:

i) a device in an A-mega-cell interfered by another device in the same cell;

ii) a device in a B-mega-cell interfered by either a device in the same cell or a device in a "matching cell" of an adjacent A-mega-cell;

iii) a device in a C-mega-cell interfered by either a device in the same cell or a device in a "matching cell" of an adjacent B-mega-cell (assuming no A-mega-cell adjacent to a C-mega-cell).

Following is an analysis of the collision rate and message receive probability per transmission cycle, in the above indicated scenarii. This rough analysis is presented in order to clarify the disclosed method and provide a person skilled in the art with some practical design insights and considerations related to this method. The following analysis assumes a uniform distribution of devices on the earth surface, starting with two active devices. It also assumes, extrapolated from FIG. 4, that A-mega-cells and B-mega-cells and C-mega-cells have roughly the same area each, and that the earth surface is divided to about 40×A-mega-cells; 160×B-mega-cells and about 120×C-mega-cells; wherein each B-mega-cell has one adjacent A-mega-cell and each C-mega-cell has 2-4 (averagely 3) adjacent B-mega-cells and no adjacent A-mega-cells; Thus, roughly: the probability for a device to be in an A-mega-cell is $Pa=40/320=0.125$; the probability for a device to be in a B-mega-cell is $Pb=160/320=0.5$; the probability for a device to be in a C-mega-cell is $Pc=120/320=0.375$; and the probability for a device to be in a specific mega-cell (either type) is $Pm=1/320=0.003$.

Then, since according to the preferred embodiment, a mega-cell is divided to 100 equal in size cells, the probability for a device to be placed in a specific cell in an A-mega-cell is $Pa/100$, and correspondingly $Pb/100$ and $Pc/100$ and $Pm/100$.

This analysis also assumes a random selection of a specific channel and a specific time slot in a cell, as indicated in step (h) in FIG. 5.

Denoting the probability for receiving a message per transmission cycle, from a device in an A-mega-cell as RPCa, and correspondingly RPCb and RPCc for B-mega-cells and C-mega-cells and RPC for the total weighted probability; the probability of a device to transmit in this cycle as TP; the probability that two devices in the same cell or in matching cells select exactly the same channel and same time slot as CTP; then formulae 1-4 are:

$$RPCa=TPa*(1-CTP*Pm/100*TPa) \quad (1)$$

$$RPCb=TPb*[1-CTP*Pm/100*(TPb+TPa)] \quad (2)$$

$$RPCc=TPc*[1-CTP*Pm/100*(TPc+3*TPb)] \quad (3)$$

$$RPC=Pa*RPCa+Pb*RPCb+Pc*RPCc \quad (4)$$

At this point, if differently than according to the disclosed method, step (e5) is cancelled and step (e4) is applied to all mega-cells, i.e. uniformly allocating all 10 channels and all 100 time slots to each and every mega-cell (hereafter: "default approach"), then: each device transmits once in a cycle, so $TPa=TPb=TPc=1$, and since preferably one channel and ten time slots are allocated to each cell, then $CTP=0.1$ (probability to select the same time slot of ten allocated to a cell); so:

"default approach", 1+1 devices: $RPCa=1-CTP*Pm/100=0.999997$;

$RPCb=1-2*CTP*Pm/100$; $RPCc=1-4*CTP*Pm/100$;

Considering back the preferred embodiment (including step e5), $TPa=0.9$; $TPb=TPc=1$; so:

preferred embodiment, 1+1 devices: $RPCa=0.9*(1-0.9*CTP*Pm/100)=0.8999975$ preferred embodiment, 1+1 devices: $RPCb=1-1.9*CTP*Pm/100$ preferred embodiment, 1+1 devices: $RPCc=1-4*CTP*Pm/100$ For two active devices, the above analysis (applying the above indicated specific parameters) shows that with the preferred embodiment, RPCa is decreased, RPCb is increased and RPCc is the same, compared to the "default approach".

However, networks as Cospas-Sarsat employ millions of devices, from which more than two can simultaneously be active. If, for example, a first device according to the present invention is potentially interfered by n other devices, instead of 1, then transmission collision may occur in the following scenarii:

i) a device in an A-mega-cell interfered by at least 1 of n other devices in the same cell;

ii) a device in a B-mega-cell interfered by at least 1 of n other devices placed either in the same cell or in a "matching cell" of an adjacent A-mega-cell;

iii) a device in a C-mega-cell interfered by at least 1 of n other devices placed either in the same cell or in a "matching cell" of an adjacent B-mega-cell.

Then, in formula (1), $(1-CTP*Pm/100*TP)$ which is the probability that no (second) device be in a specific cell and select the same channel and time slot as a first device and transmit during that cycle, is to be replaced by $(1-CTP*Pm/100*TP)^n$ which is the probability that none of n devices be in a specific cell and select the same channel and time slot as a first device and transmit during that cycle; placing $CTP=0.1$ and $Pm=0.003$ and for the "default approach" $TPa=TPb=TPc=1$; then "default approach", 1+n devices: $RPCa=(1-CTP*Pm/100)^n=(1-0.000003)^n$ $RPCb=(1-2*CTP*Pm/100)^n$; $RPCc=(1-4*CTP*Pm/100)^n$ And considering the preferred embodiment, placing $TPa=0.9$; $TPb=TPc=1$; then:

preferred embodiment, 1+n devices: $RPCa=0.9*(1-0.9*CTP*Pm/100)^n$ preferred embodiment, 1+n devices: $RPCb=(1-1.9*CTP*Pm/100)^n$ preferred embodiment, 1+n devices: $RPCc=(1-4*CTP*Pm/100)^n$ Clearly, for 1+n active devices, the above analysis shows that comparing the preferred embodiment to the "default approach", RPCb is increased and RPCc is the same, for any (positive) value of n. Yet, a skilled person may probably appreciate that RPCa might be increased or decreased by the preferred embodiment, compared to the "default approach", depending on the value of n. By approximation, RPCa for the "default approach" is $(1-0.000003)^n \approx 1-n*0.000003$; and RPCa for the preferred embodiment is $0.9*(1-0.9*0.000003)^n \approx 0.9*(1-0.9*n*0.000003)$; then, in order for RPCa to increase by the preferred embodiment, i.e. have $0.9*(1-0.9*n*0.000003)>1-n*0.000003$, it is required to have approximately n>175,000.

Denoting m as the average number of devices per cell, and q as the number of cells per mega-cell then m=n*Pm/q; also, denoting ct as the total number of orthogonal channels and time slots available for the whole system, and assuming that all ct are allocated to every mega-cell (though some time slots are denied for some mega-cells), then CTP=q/ct; so formulae (5) and (6) are a more general presentation:

$$RPCa=TPa*(1-CTP*Pm/100*TPa)^n=TPa*(1-q/ct*Pm/q*TPa)^n=TPa*(1-Pm/ct*TPa)^n \quad (5)$$

$$RPCa \approx TPa*(1-n*Pm/ct*TPa) \quad (6)$$

RPCa is improved by step (e4) of the disclosed method (compared to the "default approach" where TPa=1) if (approximately) $TPa*(1-n*Pm/ct*TPa)>1-n*Pm/ct$; for a given n, as well as Pm and ct, this is true if $1>TPa>1/(n*Pm/ct)-1$; a skilled person may appreciate that this is possible if n>ct/(2*Pm); checking again on the preferred embodiment values (ct=1000; Pm=0.003), this means approximately n>167,000.

It may also be noted that RPCb is improved by (1−TPa)*n*Pm/ct, so if for example, TPa=0.9; n=200K; Pm=0.003; ct=1000; then RPCb is improved compared to the "default approach" by 6% and RPCa is improved by about 2%. A skilled person may probably appreciate that this improvement increases linearly as n increases.

Further, the present method is particularly effective for communications with a diversity of non-geostationary satellites, which provide many overlapping footprints on the earth surface. Yet, by nature, these footprints move dynamically on the earth surface, as these satellites dynamically orbit around the earth sphere. Thus, the suggested channel allocation is valid for a limited period of time.

In this context, in the second embodiment of the disclosed method, already discussed above, channel allocation is applied to devices which transmit a service request, before been allocated operational channels that are administered by the network or system. In this case, the requesting devices may share a pool of channels for this preliminary phase of communications, from which the disclosed method can function. Upon establishing an initial contact with a satellite, the system may take control and allocate a different channel to the requesting device. Clearly, this embodiment assumes devices comprising an RF receiver configured to detect the satellite transmissions, and a programmable RF synthesizer, which can be set to different frequencies for transmission and reception.

Still in the context of the momentary nature of the present method, in the preferred embodiment of the disclosed method, the channel allocation is applied by devices that periodically transmit data packets, for each transmission a new channel is selected, based on the updated satellite footprints, according to the disclosed method. The disclosed method may then be applied on a pool of channels and time slots derived from those allocated for these transmissions.

Still referring to the preferred embodiment, a device according to the present invention may comprise unique identification data (ID), and be configured to transmit said ID along with data representing its position coordinates. This is particularly relevant to location systems and applications. In such cases, said device may be attached to an object to be located, such as: a person (particularly children and adult people), animal, pet, vehicle, weapon, ammunition, valuable asset and so on.

Regarding location systems, the most important data transmitted by a device is its position. Then, if its position does not change significantly between successive reports, this device is preferably configured to pass over one or more transmission cycles, avoiding transmission of redundant data and improving the chance of other devices to be detected. As a non limiting example, a transmission cycle is preferably skipped if a device did not move more than 100 meters compared to its previously transmitted position. In another embodiment, a device may skip a transmission cycle if its current data did not change significantly from the previously transmitted data, not necessarily related to position, but for example a sensor reading of temperature, humidity, barometric pressure, water level, pollution level, etc.

In another case, a device transmission can be acknowledged by the satellite. For example, such a feature is planed to be implemented by the Galileo GNSS, so preferably, a device is configured to pass over one or more transmission cycles upon detecting one or more such acknowledgements, as indicated in step (i) in FIG. 5. As a non limiting example, a transmission cycle is skipped by a device whose transmission was acknowledged in the previous cycle.

The invention is further directed to a computer program product in a computer readable medium for a method for allocating transmission channels to a plurality of devices configured to communicate with a diversity of satellites, comprising, for each device, the steps of:

a) determining the current time and self location via a Global Navigation Satellite System (GNSS);

b) determining the current service areas ("footprints") of said diversity of satellites on earth surface;

c) defining as a mega-cell each intersection of footprints which is not divided to further intersections;

d) determining a transmission cycle divided to time slots, synchronized with said GNSS signals;

e) allocating channels and time slots to each mega-cell, wherein channels and time slots are reused in different mega-cells, and at least for two mega-cells, fewer time slots are allocated to the mega-cell served by more satellites;

f) dividing each mega-cell into cells, at least one cell in a mega-cell;

g) allocating different channels and/or different time slots to different cells in a mega-cell, from those allocated to the corresponding mega-cell;

h) selecting a specific channel and a specific time slot from those allocated to the corresponding cell, according to at least one of: random or pseudo-random selection; unique identification data (ID) stored at each device; classification data stored and/or acquired at each device; the nature of data to be transmitted; signal/control input; current geographical location; coordination with other devices.

The invention is also directed to a communication system and device for allocating transmission channels to a plurality of such devices configured to communicate with a diversity of satellites, each of said devices comprising at least an RF transmitter coupled to a Global Navigation Satellite System (GNSS) receiver, wherein each device is configured to:

a) determine the current time and self location via said GNSS;

b) determine the current service areas ("footprints") of said diversity of satellites on earth surface;

c) define as a mega-cell each intersection of footprints which is not divided to further intersections;

d) determine a transmission cycle divided to time slots, synchronized with said GNSS signals;

e) allocate channels and time slots to each mega-cell, wherein channels and time slots are reused in different mega-cells, and at least for two mega-cells, fewer time slots are allocated to the mega-cell served by more satellites;

f) divide each mega-cell into cells, at least one cell in a mega-cell;

g) allocate different channels and/or different time slots to different cells in a mega-cell, from those allocated to the corresponding mega-cell;

h) select a specific channel and a specific time slot from those allocated to the corresponding cell, according to at least one of: random or pseudo-random selection; unique identification data (ID) stored at each device; classification data stored and/or acquired at each device; the nature of data to be transmitted; signal/control input; current geographical location; coordination with other devices.

Said computer program product, as well as said communication system and device, may refer to channels which are at least: time slots for Time Division Multiple Access (TDMA); or frequencies for Frequency Division Multiple Access (FDMA); or codes for Code Division Multiple Access (CDMA); or a combination thereof.

Also, according to said computer program product, and/or according to said communication system and device, cells statistically denser with devices can be defined smaller, and/or cells statistically with more devices can be allocated with more channels and/or time slots.

Further, said computer program product and/or said communication system and device may refer to a device comprising an ID, and configured to transmit said ID along with data representing its location.

Then, according to said computer program product, and/or said communication system and device, a device may be configured to skip some transmission cycles if previously transmitted data (e.g. location data) did not change significantly or/and if a previous transmission was acknowledged.

Furthermore, each of said devices related to said computer program product and/or said communication system and device, may be attached to an object to be located, such as: a person (particularly young, old and disabled), animal, pet, vehicle, weapon, ammunition, valuable asset.

According to one aspect of the current invention, a satellite based Search and Rescue (SAR) system is deployed, wherein devices are distress radio beacons, programmed to transmit not more than a data packet per transmission cycle, sharing a pool of frequencies and time slots. The present invention is used by these devices to select a specific frequency and time slot every transmission cycle. When active, these radio beacons are configured to transmit an ID and a self position, and skip a transmission cycle if this position did not change at least by 100 meters from the previously transmitted position.

According to another aspect of the invention, a satellite based telephone network is deployed, wherein telephones request service from the satellite network. Since it is expected that more transmissions will come from urban areas, mega-cells in these areas are divided to smaller cells, in a way that averagely a substantially similar number of service requests will come from each cell in a mega-cell. Further, when cells populated by many devices are momentarily in B-mega-cells, then nearby A-mega-cells are allocated with less time slots in order to less interfere with devices placed in these dense cells.

According to an additional aspect of the invention, remote sensors configured to be read by satellites are deployed worldwide. The sensors are a multitude of low cost and low power (battery operated) devices. In order to reduce cost, devices do not comprise a receiver (beyond a GPS receiver), neither an RF synthesizer, thus each device is factory set to a single frequency. The present invention is then utilized to minimize transmission collisions among devices, yet ensuring a sufficient probability to receive data from these remote sensors by relatively few transmissions, in order to save battery power. Assuming also a significant diversity of satellites, many overlapping footprints are formed as well as many footprint intersections, so the present invention relatively employs many mega-cells and many cells. Then, this system allocates fewer time slots to mega-cells served by more satellites (not only the maximum number of satellites). For example, if three types of mega-cells are momentarily formed, such as A-mega-cells and B-mega-cells and C-mega-cells (using the terminology of FIG. 4), C-mega-cells are allocated with all the available time slots per cycle; B-mega-cells are allocated with 95% of the time slots and A-mega-cells are allocated with 90% of the time slots per cycle.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for allocating transmission channels to a plurality of devices configured to communicate with a diversity of satellites, comprising, at each device, the steps of:
   a) determining the current time and self location via a Global Navigation Satellite System (GNSS);
   b) determining the current service areas ("footprints") of said diversity of satellites on earth surface;
   c) defining as a mega-cell each entire area covered by the same footprints;
   d) determining a transmission cycle divided to time slots, synchronized with said GNSS signals;
   e) allocating at least one channel or one time slot to each mega-cell, wherein channels and time slots are reused in different mega-cells, and at least for two mega-cells, fewer time slots are allocated to the mega-cell served by more satellites;
   f) dividing each mega-cell into cells, at least one cell in a mega-cell;
   g) allocating different channels and/or different time slots to different cells in a mega-cell, from those allocated to the corresponding mega-cell;
   h) selecting a specific channel and a specific time slot from those allocated to the corresponding cell, according to at least one of: random or pseudo-random selection; unique identification data (ID) stored at each device; classification data stored and/or acquired at each device; the nature of data to be transmitted; signal/control input; current geographical location; coordination with other devices.

2. A method according to claim 1, wherein said channels are at least: time slots for Time Division Multiple Access (TDMA); or frequencies for Frequency Division Multiple Access (FDMA); or codes for Code Division Multiple Access (CDMA); or a combination thereof.

3. A system and method according to claim 1, wherein said GNSS is one of: US Global Positioning System (GPS); Russian GLONASS (or GLONAS); European Galileo; Chinese COMPASS; Indian IRNSS, or a combination thereof.

4. A method according to claim 1, wherein a satellite footprint is determined according to at least one of: the current time; the satellite almanac; the satellite ephemeris; the satellite position; wherein said satellite data is stored or received at said device.

5. A method according to claim 1, wherein cells statistically denser with devices are smaller, or cells statistically with more devices are allocated with more channels or with more time slots, or a combination thereof.

6. A method according to claim 1, wherein said devices transmit a service request, and said satellites are configured to detect this request and allocate a different channel to the requesting device.

7. A method according to claim 1, wherein said devices periodically transmit data packets, and for each transmission at least a channel or a time slot is selected by each device.

8. A method according to claim 1, wherein each of said devices comprises unique identification data (ID), and is configured to transmit said ID along with data representing its location.

9. A method according to claim 8, wherein each of said devices is attached to an object to be located, from the following non limiting list: person, animal, pet, vehicle, weapon, ammunition, valuable asset.

10. A method according to claim 1, wherein a device is configured to skip at least one transmission cycle if data to be transmitted is substantially the same as previously transmitted, or if a previous transmission was acknowledged, or a combination thereof.

11. A computer program product comprising computer instructions embodied in a computer readable storage medium for a method for allocating transmission channels to a plurality of devices configured to communicate with a diversity of satellites, comprising:
   a) determining the current time and self location via a Global Navigation Satellite System (GNSS);
   b) determining the current service areas ("footprints") of said diversity of satellites on earth surface;
   c) defining as a mega-cell each entire area covered by the same footprints;
   d) determining a transmission cycle divided to time slots, synchronized with said GNSS signals;
   e) allocating at least one channel or one time slot to each mega-cell, wherein channels and time slots are reused in different mega-cells, and at least for two mega-cells, fewer time slots are allocated to the mega-cell served by more satellites;
   f) dividing each mega-cell into cells, at least one cell in a mega-cell;
   g) allocating different channels and/or different time slots to different cells in a mega-cell, from those allocated to the corresponding mega-cell;
   h) selecting a specific channel and a specific time slot from those allocated to the corresponding cell, according to at least one of: random or pseudo-random selection; unique identification data (ID) stored at each device; classification data stored and/or acquired at each device; the nature of data to be transmitted; signal/control input; current geographical location; coordination with other devices.

12. A computer program product according to claim 11, wherein said channels are at least: time slots for Time Division Multiple Access (TDMA); or frequencies for Frequency Division Multiple Access (FDMA); or codes for Code Division Multiple Access (CDMA); or a combination thereof.

13. A computer program product according to claim 11, wherein cells statistically denser with devices are smaller, or cells statistically with more devices are allocated with more channels or with more time slots, or a combination thereof.

14. A computer program product according to claim 11, wherein each of said devices comprises unique identification data (ID), and is configured to transmit said ID along with data representing its location.

15. A computer program product according to claim 11, wherein a device is configured to skip at least one transmission cycle if data to be transmitted is substantially the same as previously transmitted, or if a previous transmission was acknowledged, or a combination thereof.

16. A communication system and device for allocating transmission channels to a plurality of such devices configured to communicate with a diversity of satellites, each of said devices comprising at least an RF transmitter coupled to a Global Navigation Satellite System (GNSS) receiver, wherein each device is configured to:
   a) determine the current time and self location via said GNSS;
   b) determine the current service areas ("footprints") of said diversity of satellites on earth surface;
   c) define as a mega-cell each entire area covered by the same footprints;
   d) determine a transmission cycle divided to time slots, synchronized with said GNSS signals;
   e) allocate at least one channel or one time slot to each mega-cell, wherein channels and time slots are reused in different mega-cells, and at least for two mega-cells, fewer time slots are allocated to the mega-cell served by more satellites;
   f) divide each mega-cell into cells, at least one cell in a mega-cell;
   g) allocate different channels and/or different time slots to different cells in a mega-cell, from those allocated to the corresponding mega-cell;
   h) select a specific channel and a specific time slot from those allocated to the corresponding cell, according to at least one of: random or pseudo-random selection; unique identification data (ID) stored at each device; classification data stored and/or acquired at each device; the nature of data to be transmitted; signal/control input; current geographical location; coordination with other devices.

17. A communication system and device according to claim 16, wherein said channels are at least: time slots for Time Division Multiple Access (TDMA); or frequencies for Frequency Division Multiple Access (FDMA); or codes for Code Division Multiple Access (CDMA); or a combination thereof.

18. A communication system and device according to claim 16, wherein cells statistically denser with devices are smaller, or cells statistically with more devices are allocated with more channels or with more time slots, or a combination thereof.

19. A communication system and device according to claim 16, wherein each of said devices comprises unique identification data (ID), and is configured to transmit said ID along with data representing its location.

20. A communication system and device according to claim 16, wherein a device is configured to skip at least one transmission cycle if data to be transmitted is substantially the same as previously transmitted, or if a previous transmission was acknowledged, or a combination thereof.

* * * * *